United States Patent
Domergue et al.

[11] 3,879,417
[45] Apr. 22, 1975

[54] 3-4-(PYRAZOLE-1-YL)-3-HALOPHENYL-7-ALKOXY COUMARIN DERIVATIVES

[75] Inventors: Annick Marthe Suzanne Simone Domergue, Eaubonne; Robert Frederic Michel Sureau, Enghien les Bains, both of France

[73] Assignee: Produits Chimiques Ugine Kuhlmann, Paris, France

[22] Filed: Apr. 17, 1973

[21] Appl. No.: 351,941

[30] Foreign Application Priority Data
Apr. 18, 1972 France............................. 72.13524

[52] U.S. Cl. 260/310 R; 117/33.5 T; 252/301.3 W; 260/141
[51] Int. Cl............................................ C07d 49/18
[58] Field of Search................................. 260/310 R

[56] References Cited
UNITED STATES PATENTS
3,660,424   5/1972   Kabas et al. ............... 260/310 R OTHER PUBLICATIONS
Dorlars et al., Chem. Abst., Vol. 73, No. 78561k, (1970), QD1.A51.
Kabas et al., Chem. Abst., Vol. 73, No. 36588u (1970), QD1.A51.
Raue, Chem. Abst., Vol. 69, No. 28611y (1968), QD1.A51.
Sakaue et al., I Chem. Abst., Vol. 73, No. 99987u (1970). QD1.A51.
Sakaue et al., II J. Chem. Soc., Japan, Industrial Chemical Section, Vol. 73, pages 348–351 (1970), TP1.C384.

*Primary Examiner*—Natalie Trousof

[57] ABSTRACT

Coumarin compounds of the formula:

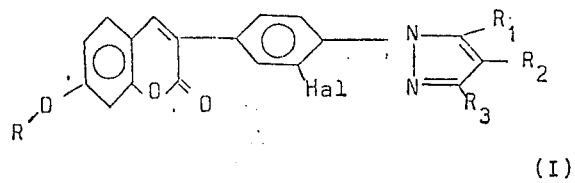

(I)

in which Hal represents a halogen, R represents an alkyl group containing 1 to 5 carbon atoms either unsubstituted or substituted by a non-ionic and non-chromophoric group, each of the substituents $R_1$, $R_2$ or $R_3$, which are the same or different, representing a hydrogen or halogen atom, or an alkyl group comprising from 1 to 3 carbon atoms, or an aryl group; processes for their preparation and their use as fluorescent brightening agents for polyester fibres.

3 Claims, No Drawings

3-4-(PYRAZOLE-1-YL)-3-HALOPHENYL-7-ALKOXY COUMARIN DERIVATIVES

The invention relates to new coumarin derivatives, to their preparation and to their use as fluorescent brightening agents.

It has already been proposed to use as optical brightening agents 7-alkoxy-coumarins substituted in the 3-position by a (2)-4-benzotriazolyl-phenyl radical (French Pat. No. 1,411,433). But in general these compounds give brightening agents verging on green on polyester fibres, and therefore are not much appreciated or not very efficient. They are only moderately fast to light.

It has now been found according to the present invention that it is possible to obtain on fibres based on polyesters a much more neutral whitening effect having excellent general fastness.

By "polyester fibres" are meant the fibres obtained by polycondensation of diacids with dialcohols, especially those resulting from the polycondensation of terephthalic acid with ethyleneglycol. Such fibres are sold on the market by the names of "Tergal", "Dacron", and "Terylene".

The compounds enabling an improvement of the whitening effect to be obtained correspond to the general formula:

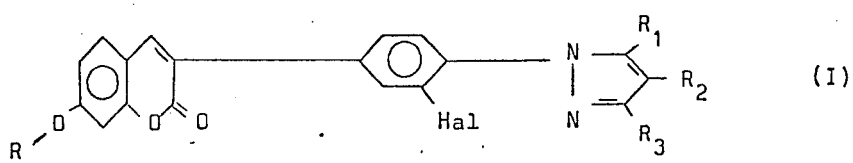

in which Hal represents a halogen atom, R represents an alkyl group containing 1 to 5 carbon atoms, possibly substituted by a non-ionic and non-chromophoric group, each of the substituents $R_1$, $R_2$ or $R_3$ which may be the same or different representing a hydrogen or halogen atom, an alkyl group comprising 1 to 3 carbon atoms, or an aryl group.

The non-ionic and non-chromophoric groupings, for example, may be a halogen or a hydroxy, methoxy or ethoxy group.

The aryl group is a benzene radical which may carry from one to three substituents, for example a halogen atom or an alkyl group containing from 1 to 3 carbon atoms.

These new fluorescent brightening agents may be obtained for example by various processes known from the synthesis of the coumarins, such as:

1. Reaction of a diazonium salt of formula (II) on a coumarin of formula (III):

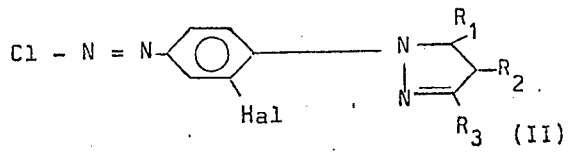

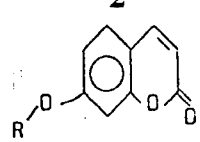

in which formulae R, $R_1$, $R_2$ and $R_3$ have the significance indicated above.

2. Reaction of an orthohydroxybenzaldehyde of formula (IV) with an acid of formula (V) or one of its functional derivatives:

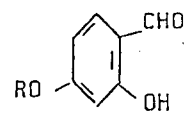

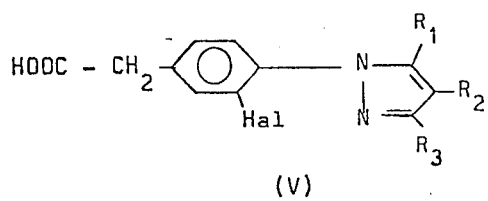

in which formulae R, $R_1$, $R_2$ and $R_3$ have the significance given above. The functional derivatives of the acid (V) may be for example an alkali metal salt, the nitrile, or a methyl or ethyl ester.

3. Alkylation of a compound of the formula:

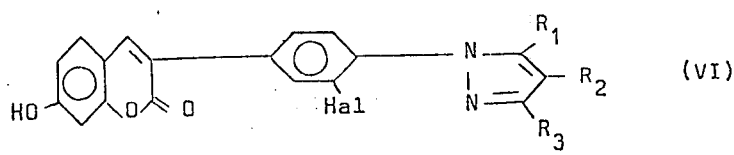

in which $R_1$, $R_2$ and $R_3$ have the same significance as above, by means of an alkylating agent for example a dialkyl sulphate, such as dimethyl or diethyl sulphate.

The compound of formula (VI) can itself be prepared for example by one of the following methods:
reaction of the diazonium salt of formula (II) with 7-hydroxy-coumarin, or
reaction of the acid of formula (V) one of its functional derivatives with 2,4-dihydroxy-benzaldehyde.

These functional derivatives may comprise, for example, an alkali metal salt, the nitrile, or the methyl or ethyl ester.

The compounds according to the invention are light yellow or almost white powders, insoluble in water and soluble inorganic media such as for example alcohols, dioxan, or aromatic hydrocarbons, in which they show a very bright violet blue fluorescence.

In order to brighten the organic fibrous materials, especially polyester fibres, the compounds of the invention are used in the form of aqueous dispersions. The concentration of brightening agent may vary for example from 0.005% to 0.5% with regard to the weight of the fibrous material. The blueing or brightening may be effected by dyeing under pressure, for example at between 120°C. and 130°C. or at the boil at ordinary pressure in the presence of an agent which makes the fibre swell ("carrier"). The fibres brightened with the coumarins according to the invention show a dazzling brightening effect in daylight, as well as excellent general fastness, especially to light.

The following Examples illustrate the present invention, without restricting its scope thereto. The parts and percentages are by weight.

EXAMPLE 1

Preparation of 3-[4-(3,5-dimethyl-1,2-pyrazole-1-yl)-3-chloro-phenyl]-7-methoxy-coumarin.

11 parts of 1-(4-amino-2-chloro-phenyl)-3,5-dimethyl-pyrazole (m.p. 149°C.) are dissolved in 50 parts of water and 12.5 parts of concentrated hydrochloric acid. The mixture is cooled to 0°C and diazotised with a solution of 3.5 parts of sodium nitrite in 10 parts of water. This solution of the diazonium salt is added with stirring to a solution of 8.8 parts of 7-methoxy-coumarin in 50 parts of acetone containing 10 parts of sodium acetate. 1.25 parts of cuprous chloride in solution in 5 parts of water are immediately added and the mixture is stirred for 3 hours until no more gas is evolved. The oil obtained by decantation is taken up in a little alcohol and filtered. The coumarin derivative obtained (7.3 parts) is then crystallised from ethanol. It melts at 215°C and shows a strong violet-blue fluorescence in alcoholic solution.

| Analysis | % C | calculated: | 66.2 | Found: | 65.3 |
|---|---|---|---|---|---|
|  | N | " | 7.35 | " | 7.17 |
|  | H | " | 4.46 | " | 4.48 |
|  | Cl | " | 9.32 | " | 9.20 |

EXAMPLE 2

Preparation of 3-[4-(3,5-dimethyl-1,2-pyrazole-1-yl)-3-chloro-phenyl]-7-ethoxy-coumarin.

On replacing in Example 1 the 8.8 parts of 7-methoxy-coumarin by 9.5 parts of 7-ethoxy-coumarin, 3.5 parts of the coumarin derivative are obtained, which after crystallisation from ethanol melts at 185°C.

| Analysis | % C | calculated: | 66.92 | Found: | 66.79 |
|---|---|---|---|---|---|
|  | N | " | 7.09 | " | 7.04 |
|  | H | " | 4.81 | " | 4.86 |
|  | Cl | " | 8.99 | " | 9.07 |

EXAMPLE 3

11 parts of 3-[4-(3,5-dimethyl-1,2-pyrazole-1-yl)-3-chloro-phenyl]-7-hydroxy-coumarin are dissolved in 150 parts of acetone and 4.6 parts of potassium carbonate are added, then 3 parts of methyl sulphate. The mixture is heated under reflux for 6 hours, the acetone is distilled off and 100 parts of water are added. It is stirred for half an hour and then filtered and the solid washed with water. 10 parts of a product identical with that of Example 1 are obtained of m.p. 215°C.

The starting substance is prepared by a similar process to that of Example 1, by reacting the diazonium salt of 11 parts of 4-amino-2-chloro-1-phenyl-3,5-dimethyl-pyrazole with 8.1 parts of 7-hydroxy-coumarin. After crystallisation from alcohol, 4.9 parts of 3-[4-(3,5-dimethyl-1,2-pyrazole-1-yl)-3-chlorophenyl]-7-hydroxy-coumarin are obtained, m.p. 303°C.

EXAMPLE 4

0.005 parts of the coumarin derivative obtained in Example 1 are dispersed in 100 parts of water with 0.010 parts of dispersing agent, then 1.25 parts of polyester fibres are tinted under pressure at 130°C for 1½ hours. After rinsing and drying, the fibre thus treated shows a very neutral brightening effect and excellent general fastness.

We claim:

1. Coumarin compound of the formula:

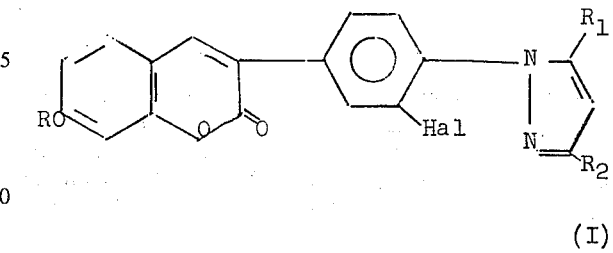

(I)

in which Hal represents halogen, R represents an alkyl group of 1 to 5 carbon atoms, each of the substituents $R_1$ or $R_2$, which are the same or different, represents an alkyl group of 1 to 3 carbon atoms or a phenyl group.

2. 3-[4-(3,5-dimethyl-1,2-pyrazole-1-yl)-3-chlorophenyl]-7-methoxy coumarin.

3. 3-[4-(3,5-dimethyl-1,2-pyrazole-1-yl)-3-chlorophenyl]-7-ethoxy coumarin.

* * * * *